(No Model.) 2 Sheets—Sheet 1.

W. E. HARTMANN & A. RAYMOND.
Friction Clutch for Machinery.

No. 230,773. Patented Aug. 3, 1880.

WITNESSES
James T. Tobin.
Henry Howson Jr.

INVENTORS.
William E. Hartmann
and August Raymond
by their attorney
Howson and Son

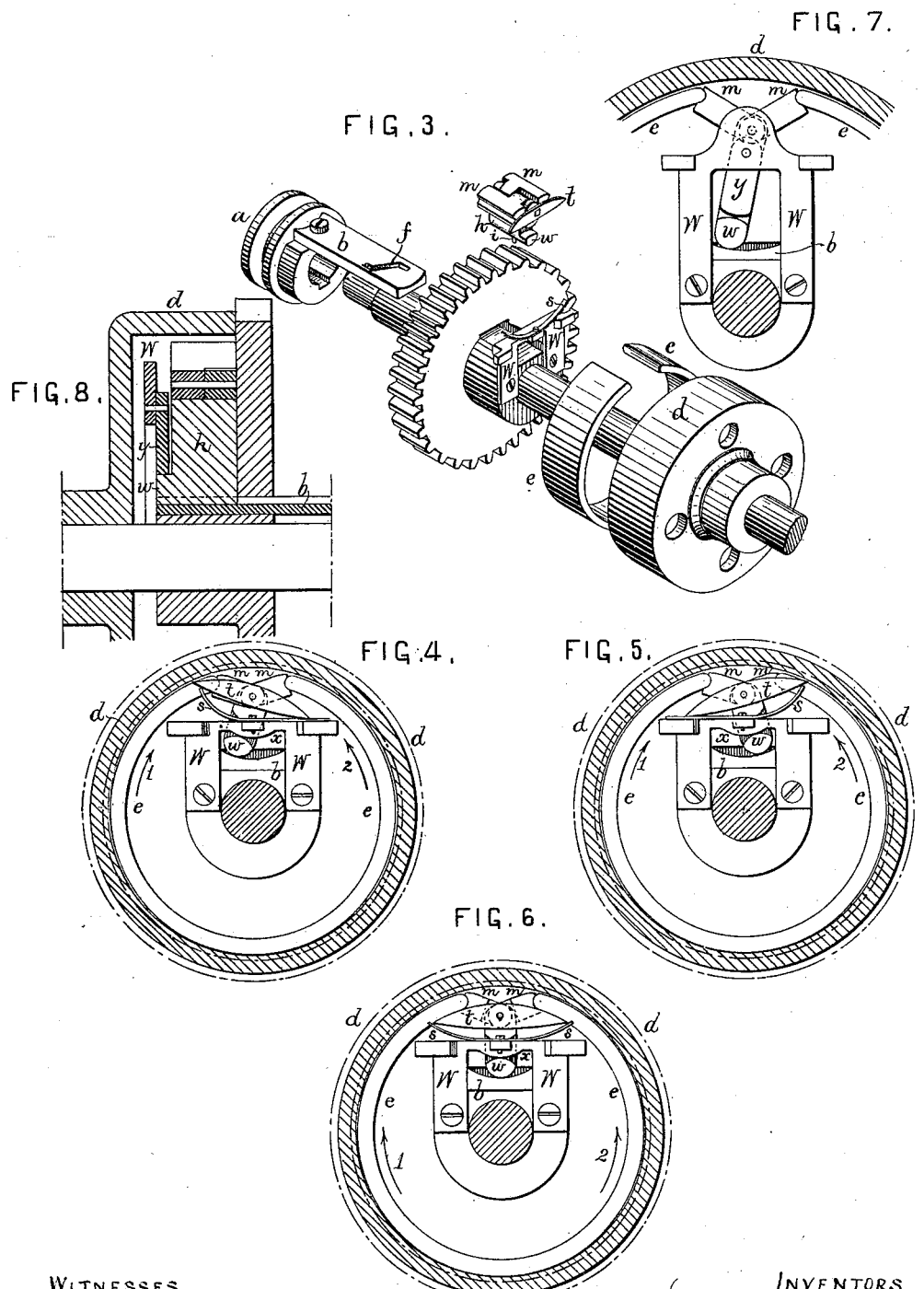

UNITED STATES PATENT OFFICE.

WILLIAM E. HARTMANN AND AUGUST RAYMOND, OF PHILADELPHIA, PA.

FRICTION-CLUTCH FOR MACHINERY.

SPECIFICATION forming part of Letters Patent No. 230,773, dated August 3, 1880.

Application filed April 9, 1880. (No model.)

*To all whom it may concern:*

Be it known that we, WILLIAM E. HARTMANN and AUGUST RAYMOND, citizens of the United States, residing in Philadelphia, Pennsylvania, have invented an Improvement in Friction-Clutches for Machinery, of which the following is a specification.

Our invention relates to a certain friction-clutch especially adapted for use in connection with that class of mechanical movements in which the reciprocating movement of a rod or bar is transmitted by clutches and gearing to a rotating shaft, the object of our invention being to so construct the clutch that the stoppage, or stoppage and reversal, of the rotating shaft may be readily effected without interfering with the movements of the reciprocating rod or bar.

Figure 1:
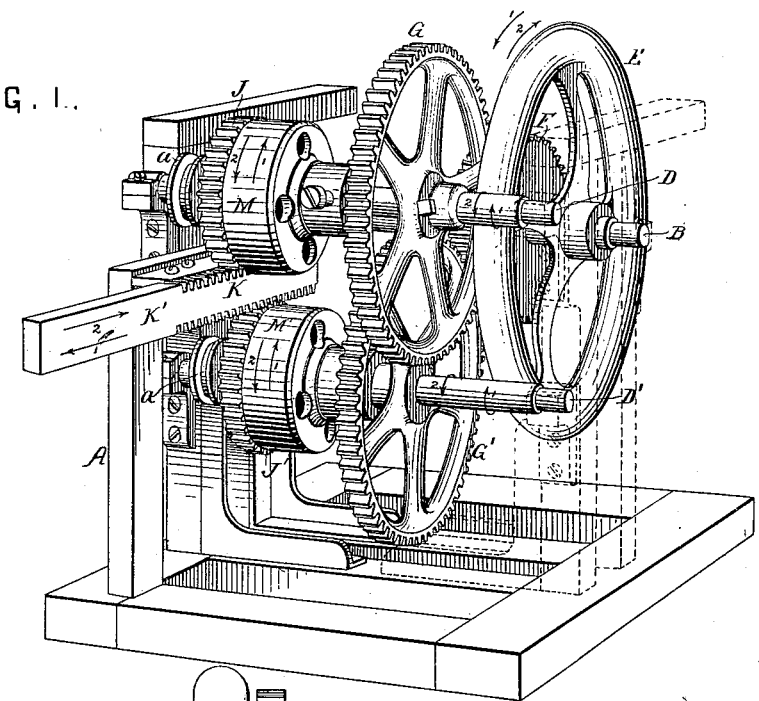
Figure 2:
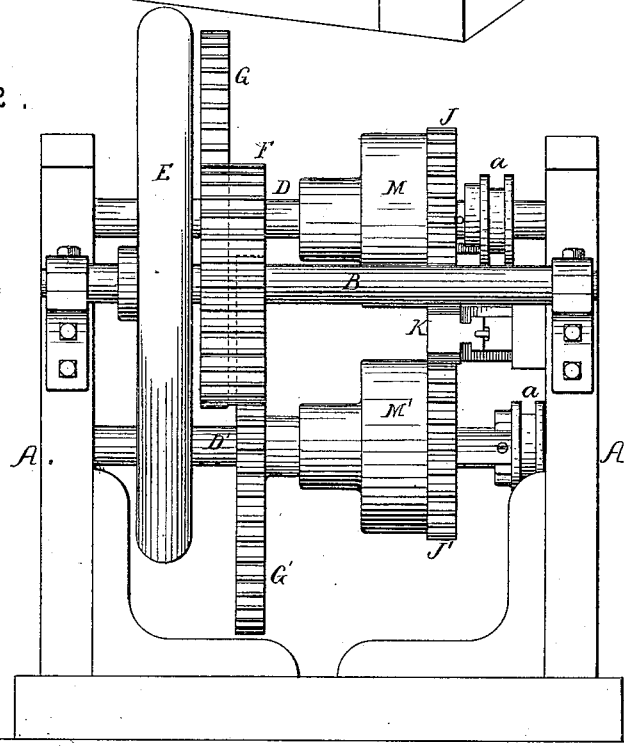

In the accompanying drawings, Figure 1, Sheet 1, is a perspective view of a mechanical movement in which our improved clutch is used; Fig. 2, a rear view of the same; Fig. 3, Sheet 2, a view of the detached parts of the clutch which forms the subject of our invention; Figs. 4, 5, and 6, diagrams illustrating the different positions assumed by the parts of the clutch, and Figs. 7 and 8 views of a modification of part of the clutch.

A A are the opposite side frames of the device, having bearings for three shafts, B, D, and D'. The shaft B is the main shaft and carries a fly-wheel, E, and a pinion, F, the latter engaging with cog-wheels G G', secured, respectively, to the shafts D D'.

The shaft D has a pinion, J, and clutch M, and the shaft D' has a similar pinion, J', and clutch M', the pinions J J' engaging with a double rack, K, formed on a bar, K', which may be secured to or form part of the piston-rod of an engine, or may represent a reciprocating portion of any other piece of machinery.

Each of the clutches M M' is constructed in the peculiar manner fully described hereinafter, so that the pinion may be clutched to the shaft when moving forward and allowed to turn loosely on the shaft when moving backward, or may be clutched to the shaft when moving backward and allowed to turn loosely on its forward movement, or may be free to turn in both directions independently of the shaft. By this means the reciprocation of the rack-bar K' may be caused to turn the main shaft B either forward or backward, or said bar may be reciprocated without imparting movement to the shaft B, or the bar may be locked in position and its reciprocation prevented. Thus when it is desired to turn the shaft B forward, or in the direction of the arrow 2, the clutches M M' are adjusted so that the pinions J J' will be clutched to the shafts D D' on the backward movement of the pinions, as shown by the arrow 2, and free from said shafts on the forward movement, as shown by the arrows 1.

On the forward movement of the bar K' in the direction of the arrow 2, the upper pinion, J, imparts movement in the direction of the arrow 2 to the shaft D, and through the cog-wheel G and pinion F to the shaft B, the pinion J' meanwhile turning loosely forward on the shaft D'. On the backward movement of the bar K' in the direction of the arrow 1, however, the pinion J turns loosely forward on the shaft D, while the pinion J' imparts movement in the direction of the arrow 2 to the shaft D', and through the gearing described to the shaft B.

When it is desired to turn the shaft B backward or in the direction of the arrow 1, the clutches M M' are adjusted so that the forward movement of the pinions J J', as in the direction of the arrows 1, is imparted to the shafts D D', the pinions turning loosely on their backward movement. On reciprocating the bar K' the operations above described will be reversed and the shafts B will be turned backward.

When it becomes necessary to reciprocate the bar K' without imparting movement to the shaft B, the clutches M M' are adjusted so that both pinions J J' are free to turn on their respective shafts in both directions, and when it is desired to lock the bar K' in position the clutches are adjusted so that the pinion J is free to turn in one direction and the pinion J' in the opposite direction. The pinions then act in opposition to each other, and thus prevent the reciprocation of the bar K'.

The peculiar construction of the clutch whereby the above changes are effected is fully illustrated in Sheet 2, on reference to Fig. 3 of which it will be seen that the clutch comprises the pinion loose on the shaft, a flanged cap, d, secured to the shaft, a split ring, e, and devices for expanding said ring.

The expanding devices consist of a bar, b, a block, h, and pivoted dogs m m. The bar b projects from the sleeve a, and is adapted to a slot in the hub of the pinion, the upper surface of the bar being concave, and a slot, f, partly straight and partly inclined, being formed in said bar for the reception of a pin, i, on the lower end of the block h, the upper end of the latter carrying the pivoted dogs m m, one of which bears against one end of the ring e and the other against the opposite end of the said ring.

A frame, W, is carried by the hub of the pinion, and to this frame is secured a spring, s, which acts on a plate, t, carried by the block h, the tendency of the spring being to retain the ends of the dogs m in contact with the ends of the split ring e. A curved projection, x, is also formed on the frame W, the face of this projection being concentric with the concave face of the bar b, and acting on a lug, w, on the block h, so as to keep the lower end of the said block always in contact with the concave face of the bar.

When it is desired to clutch the pinion to the shaft on the forward movement of the pinion in the direction of the arrow 1 and release it on its backward movement in the direction of the arrow 2, the sleeve a and its bar b are adjusted to such a position that, owing to the action of the slot f on the pin i of the block h, said block is inclined to the left, as shown in Fig. 4. On moving the pinion forward in the direction of the arrow 1 the movement will be imparted to the inner end of the block h, and the opposite end of the same will be thrust outward, so that the dogs m m will act as toggle-levers and serve to expand the ring e until it binds tightly against the inner face of the flange of the cap d, the cap, ring, dogs, and block then turning with the pinion in the direction of the arrow 1. The frictional contact of the ring e and cap d will continue as long as the pinion is moved forward; but when the pinion is moved backward, or in the direction of the arrow 2, the outward thrust on the block h ceases, and the ring e is released from frictional contact with the flanged cap.

When it is desired to clutch the pinion to its shaft when said pinion moves backward, and release it when it moves forward, the sleeve a is adjusted so as to incline the block h to the right, as shown in Fig. 5, when the operations above described will be reversed, the ring e being forced into frictional contact with the flanged cap on the backward movement of the pinion, and released on the forward movement.

In order to permit the pinion to turn freely in both directions on its shaft the sleeve a is adjusted so that the block h occupies a central position, as shown in Fig. 6, and there is no outward thrust of the block on either movement of the pinion.

When the bar K' is secured to or forms part of the piston-rod of an engine, said rod should also be furnished with dash-pots or equivalent elastic cushions for action thereon at and near each end of the stroke, in order to prevent damage to the head of the cylinder in the event of such an accident to the valve or valve-gear as would prevent said valve from performing its proper duties.

In Figs. 7 and 8 we have shown a modification of part of the clutch, the curved face x on the frame W in this case being replaced by a finger, y, hung to the frame at the upper end and bearing at the lower end on the lug w of the block h, the pivot-pin of the finger bearing such relation to the concave face of the bar b that the lower end of said finger moves in a path concentric with the said concave face.

We claim as our invention—

1. The combination of a shaft, a wheel or pinion loose thereon, a flanged cap or drum secured to the shaft, an expansible ring, a block, h, and means whereby the outward thrust on the block is caused to expand the ring, said block being adjustable in respect to the abutment on the wheel or pinion, so as to assume either an operative or an inoperative position, whereby the said wheel or pinion may be clutched to or released from the cap or drum by simply shifting the block h, all substantially as specified.

2. The combination of a shaft, a wheel or pinion loose thereon, a flanged cap or drum secured to the shaft, an expansible ring, a block, h, and means whereby the outward thrust on the block is caused to expand the ring, said block being adjustable, as set forth, so as to assume reverse angles in respect to the abutment on the wheel or pinion, whereby either the forward or backward movement of said wheel or pinion may be transmitted to the cap or drum, all substantially as set forth.

3. The combination of a shaft, a wheel or pinion loose thereon, a flanged cap or drum, d, secured to the shaft, an expansible ring, e, a block, h, having a pin, i, means whereby the thrust on the block is caused to expand the ring, and an adjustable bar, b, having a concave face forming an abutment for the block e, and a slot, f, for the reception of the pin i, as set forth.

4. The combination of a shaft, a wheel or pinion loose thereon, a flanged cap or drum, d, secured to the shaft, an expansible ring, e, an adjustable block, h, having a plate, t, a frame, W, a spring, s, and means whereby the outward thrust on the block h is caused to expand the ring e, as set forth.

5. The combination of the shaft, the loose wheel or pinion, the fast cap or drum d, the expansible ring e, a block, h, having a lug, w, and adapted to bear on a concave abutment on the wheel or pinion, means for expanding the ring *e* on the outward thrust of the block *h*, and a frame, W, having a concave face, *x*, or equivalent means, as described, for acting on the lug *w* and maintaining the end of the block *h* in contact with its abutment, as set forth.

In testimony whereof we have signed our names to this specification in the presence of two subscribing witnesses.

WM. E. HARTMANN.
A. RAYMOND.

Witnesses:
JAMES F. TOBIN,
HARRY SMITH.

Affidavit having been filed showing that the name of one of the patentees in Letters Patent No. 230,773, granted August 3, 1880, for an improvement in "Friction-Clutches for Machinery," should have been written and printed *William C. Hartmann* instead of "William E. Hartmann," it is hereby certified that the said Letters Patent should be read with this correction therein to make it conform to the record of the case in the Patent Office.

Signed, countersigned, and sealed this 30th day of September, A. D. 1884.

[SEAL.]

H. M. TELLER,
*Secretary of the Interior.*

Countersigned:
R. G. DYRENFORTH,
*Acting Commissioner of Patents.*